United States Patent
Takahashi

(10) Patent No.: US 10,475,158 B2
(45) Date of Patent: Nov. 12, 2019

(54) IMAGE PROCESSING DEVICE

(71) Applicant: MegaChips Corporation, Osaka-shi (JP)

(72) Inventor: Kazuyuki Takahashi, Osaka (JP)

(73) Assignee: MEGACHIPS CORPORATION, Osaka-shi (JP)

( * ) Notice: Subject to any disclaimer, the term of this patent is extended or adjusted under 35 U.S.C. 154(b) by 486 days.

(21) Appl. No.: 13/964,476

(22) Filed: Aug. 12, 2013

(65) Prior Publication Data
US 2014/0112393 A1  Apr. 24, 2014

(30) Foreign Application Priority Data
Oct. 18, 2012  (JP) .................................. 2012-230888

(51) Int. Cl.
*G06T 3/40* (2006.01)
*H04N 19/423* (2014.01)

(52) U.S. Cl.
CPC ......... *G06T 3/4007* (2013.01); *H04N 19/423* (2014.11)

(58) Field of Classification Search
CPC .. H04N 7/26; H04N 19/00484; H04N 19/423; G06T 3/4007
USPC ...................................................... 375/240.25
See application file for complete search history.

(56) References Cited

U.S. PATENT DOCUMENTS

| | | | | |
|---|---|---|---|---|
| 4,860,109 A * | 8/1989 | Kawakami | ................ | G06T 1/60 358/400 |
| 6,075,899 A * | 6/2000 | Yoshioka | ............... | H04N 5/907 382/233 |
| 6,104,416 A * | 8/2000 | McGuinness | ...... | H04N 21/4143 345/544 |
| 6,629,160 B1 * | 9/2003 | Morita | ..................... | G06F 13/28 710/22 |
| 6,791,620 B1 * | 9/2004 | Elswick | ................... | H04N 7/01 348/441 |
| 7,015,918 B2 * | 3/2006 | Linzer | .................. | H04N 19/186 345/537 |

(Continued)

FOREIGN PATENT DOCUMENTS

| | | |
|---|---|---|
| JP | 2000-138826 | 5/2000 |
| JP | 2000-322374 | 11/2000 |

(Continued)

OTHER PUBLICATIONS

Office Action dated Jul. 26, 2016 in Japanese Patent Application No. 2012-230888 (with Partial English translation).

*Primary Examiner* — Richard A Hansell, Jr.
(74) *Attorney, Agent, or Firm* — Xsensus, LLP

(57) ABSTRACT

An image processing device includes: a first storage unit to store image data containing pixel data about a plurality of components of each pixel arranged according to a first rule; a second storage unit having a plurality of storage areas to individually store the image data read from the first storage unit; a process controller to control reading of the image data from the first storage unit to the second storage unit and to output a control signal containing information used to designate a specific storage area being one of the storage areas; a multiplexer to output pixel data in order according to a second rule by selecting, based on the control signal, pixel data stored in the specific storage area from pixel data stored in the storage areas; and a 4-tap filter to calculate pixel information about an interpolated pixel.

13 Claims, 14 Drawing Sheets

(56) References Cited

U.S. PATENT DOCUMENTS

| | | | | |
|---|---|---|---|---|
| 7,557,811 B2* | 7/2009 | Linzer | | G09G 5/39 345/531 |
| 7,868,898 B2* | 1/2011 | Jeffrey | | G09G 5/39 345/531 |
| 8,582,168 B2* | 11/2013 | Hasui | | H04N 1/40068 358/1.1 |
| 8,805,170 B2* | 8/2014 | Hellman | | H04N 19/186 386/326 |
| 2004/0130553 A1* | 7/2004 | Ushida | | G06T 1/0007 345/531 |
| 2005/0105623 A1* | 5/2005 | Linzer | | H04N 19/423 375/240.25 |
| 2006/0001629 A1* | 1/2006 | Obinata | | G09G 3/3611 345/90 |
| 2006/0007353 A1* | 1/2006 | Matsutani | | H04N 9/646 348/441 |
| 2006/0132874 A1* | 6/2006 | Ishikawa | | G06T 1/20 358/518 |
| 2006/0215920 A1* | 9/2006 | Yokose | | H04N 19/105 382/238 |
| 2007/0269123 A1* | 11/2007 | Briggs | | H04N 1/409 382/254 |
| 2008/0174822 A1* | 7/2008 | Kaimi | | H04N 5/23248 358/1.16 |
| 2011/0273462 A1* | 11/2011 | Yang | | G09G 5/393 345/536 |
| 2011/0292422 A1* | 12/2011 | Ishikawa | | G06T 1/20 358/1.9 |

FOREIGN PATENT DOCUMENTS

| | | |
|---|---|---|
| JP | 2002-290983 A | 10/2002 |
| JP | 2002-359856 A | 12/2002 |
| JP | 2004-220584 A | 8/2004 |
| JP | 2006-178546 A | 7/2006 |
| JP | 2006-270325 A | 10/2006 |
| JP | 2009-159631 A | 7/2009 |
| JP | 2010-182000 A | 8/2010 |
| JP | 2011-139165 A | 7/2011 |

* cited by examiner

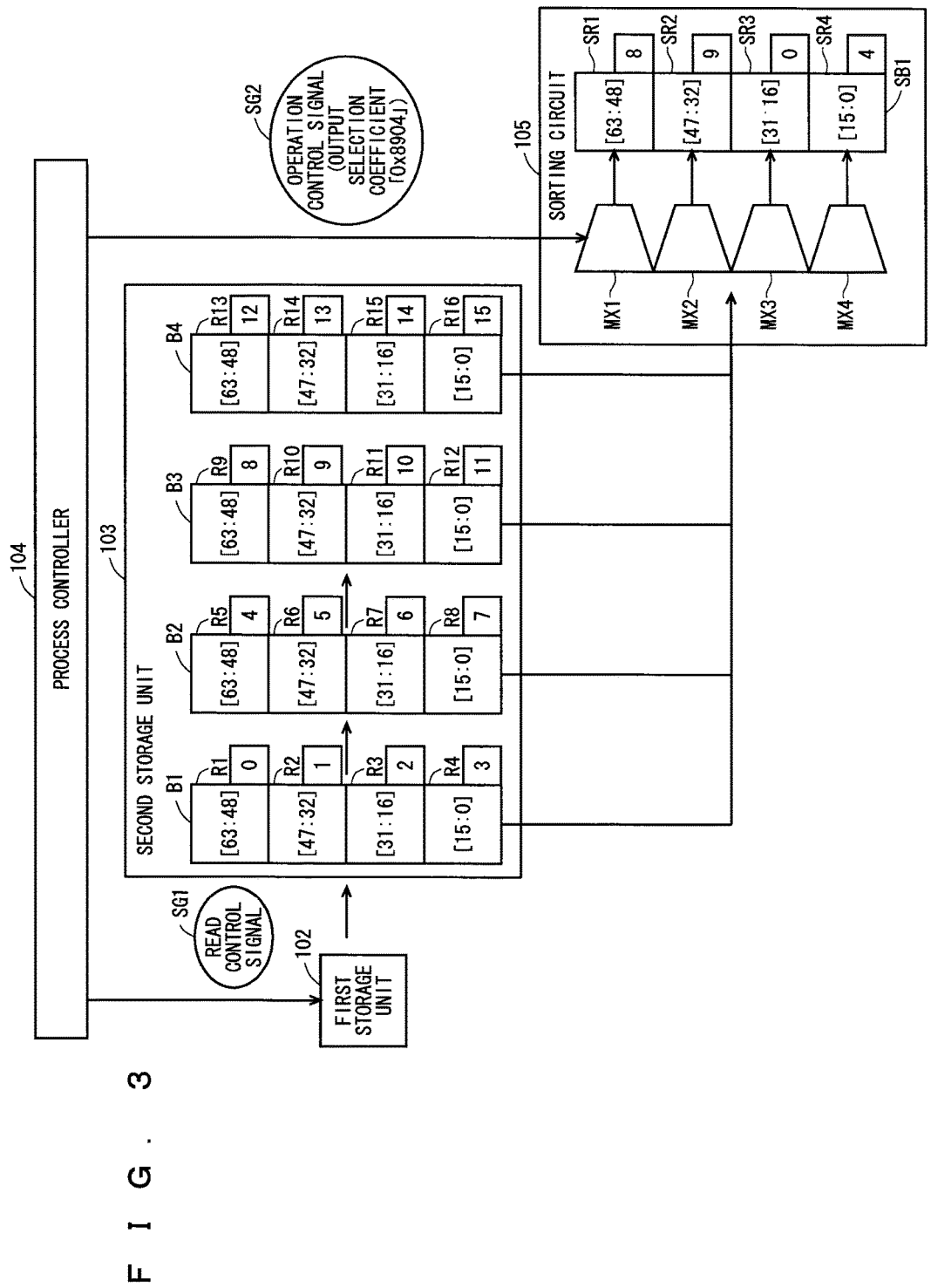
F I G. 3

IMAGE PROCESSING DEVICE

BACKGROUND OF THE INVENTION

Field of the Invention

The present invention relates to an image processing technique.

Description of the Background Art

There are various techniques relating to image processes on image data.

As an example, Japanese Patent Application Laid-Open No. 2000-322374 describes a technique of converting what is called dot-sequential data containing information about a color element being transmitted per pixel to what is called plane-sequential data containing information about each color element being transmitted individually per page.

As another example, Japanese Patent Application Laid-Open No. 2000-138826 describes a technique relating to scaling process of scaling up or down an image by an arbitrarily designated factor.

Mounting circuits responsible for the aforementioned image processes separately on an image processing device realizes all these image processes in the image processing device. However, this in turn increases a circuit size, leading to cost increase.

Thus, it is an object of the present invention to provide a technique capable of reducing the circuit size of an image processing device to perform various image processes.

SUMMARY OF THE INVENTION

According to a first aspect of the image processing device, the image processing device includes: a first storage unit to store image data containing pieces of pixel information about a plurality of components of each pixel arranged according to a first rule; a second storage unit having a plurality of storage areas to individually store the image data read from the first storage unit for each of the pieces of pixel information; a controller to control reading of the image data from the first storage unit to the second storage unit and to output a control signal containing information used to designate a specific storage area being one of the storage areas; a selection unit capable of outputting pixel information in order according to a second rule by selecting, based on the control signal, a piece of pixel information stored in the specific storage area out of the pieces of pixel information stored in the storage areas; and an interpolation calculation unit to calculate pixel information about an interpolated pixel by making interpolation calculation using pixel information input into the interpolation calculation unit and an interpolation coefficient. The controller makes the first storage unit output part of the image data such that pieces of pixel information about the same type of component of two or more successive pixels are stored in the second storage unit. The controller makes the second storage unit output, to the interpolation calculation unit, the pieces of pixel information about the same type of component of the two or more successive pixels, and outputs the interpolation coefficient to the interpolation calculation unit. The interpolation calculation unit outputs pixel information about an interpolated pixel calculated by using the pieces of pixel information about the same type of component of the two or more successive pixels and the interpolation coefficient.

According to a second aspect of the image processing device, the image processing device of the first aspect further includes an averaging unit to output the average of two pieces of pixel information input into the averaging unit. The controller makes the first storage unit output part of the image data such that pieces of pixel information about the same type of component of successive pixels are stored in the second storage unit. The controller makes the second storage unit output, to the averaging unit, pieces of pixel information about the same type of component of two successive pixels. The averaging unit outputs the average of the pieces of pixel information about the same type of component of the two successive pixels as pixel information about the same type of component common to the two successive pixels.

According to a third aspect of the image processing device, in the first aspect, the image data stored in the first storage unit is plane-sequential image data in which pieces of pixel information about each of a plurality of components arranged on a field basis or a frame basis. The controller makes the first storage unit output part of the plane-sequential image data such that pieces of pixel information about all components of the same pixel are stored in the second storage unit. The controller makes the selection unit output pixel information such that pieces of pixel information about a plurality of components are output together in units of pixels.

According to a fourth aspect of the image processing device, in the first aspect, the image data stored in the first storage unit is dot-sequential image data in which pieces of pixel information about a plurality of components arranged in units of pixels. The controller makes the first storage unit output part of the dot-sequential image data such that pieces of pixel information about all components of two or more successive pixels are stored in the second storage unit. The controller makes the selection unit output pixel information such that pieces of pixel information about the same type of component are output together.

According to a fifth aspect of the image processing device, in the first aspect, the controller makes the first storage unit output part of the image data such that pieces of pixel information about all components of the same pixel are stored in the second storage unit. The controller outputs the same control signal several times according to a magnification factor. The selection unit outputs pixel information about each component of the same pixel several times based on the same control signal input into the selection unit several times.

According to a sixth aspect of the image processing device, in the first aspect, the image data stored in the first storage unit is decoded data in units of blocks after being subjected to a video compression process. The controller makes the first storage unit output part of the decoded data such that pieces of pixel information about all components of the same pixel are stored in the second storage unit. The controller makes the selection unit output pixel information such that pieces of pixel information about corresponding components are output together in units of pixels.

According to a seventh aspect of the image processing device, the image processing device includes: a first storage unit to store image data containing pieces of pixel information about a plurality of components of each pixel arranged according to a first rule; a second storage unit having a plurality of storage areas to individually store the image data read from the first storage unit for each of the pieces of pixel information; a controller to control reading of the image data from the first storage unit to the second storage unit and to output a control signal containing information used to designate a specific storage area being one of the storage areas; and a selection unit to output pixel information in order according to a second rule by selecting, based on the control signal, a pieces of pixel information stored in the specific storage area out of the pieces of pixel information stored in the storage areas.

The aforementioned image processing device is capable of reducing the circuit size of the image processing device to perform various image processes.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 briefly explains the operation of the image processing device using a sorting circuit;

DESCRIPTION OF THE PREFERRED EMBODIMENTS

Figure 1:
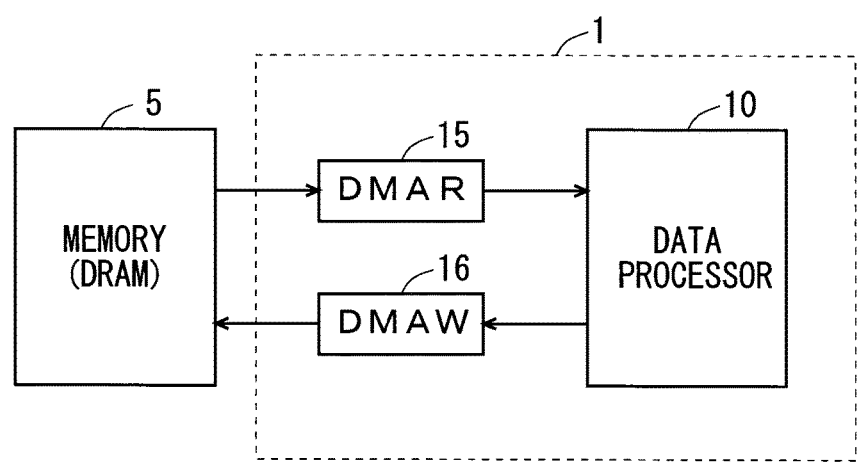
FIG. 1 is a schematic view of the structure of an image processing device of a preferred embodiment.

A preferred embodiment is described below by referring to the drawings. Elements appearing on different drawings and identified by a common reference number mean that they are the same element or corresponding elements.

1. Preferred Embodiment

[1-1. Structure]

FIG. 1 is a schematic view of the structure of an image processing device 1 of a preferred embodiment.

As shown in FIG. 1, the image processing device 1 includes a data processor 10 that reads image data from a memory 5 such as a DRAM and performs various image processes on the image data thereby read.

As an example, the data processor 10 performs a dot-sequential to plane-sequential conversion process of converting image data of a dot-sequential format (dot-sequential image data) where information about a color element is arranged in units of pixels to image data of a plane-sequential format (plane-sequential image data) where information about a color element is arranged on a field basis or a frame basis. The data processor 10 also performs a plane-sequential to dot-sequential conversion process of converting plane-sequential image data to dot-sequential image data. The data processor 10 further performs a down-sampling process, a simple magnification process realized by copying, an interpolation magnification process, and a decoded data conversion process of converting data (decoded data) after being subjected to a video compression process. Each image process performed in the data processor 10 is described in detail later.

The image processing device 1 employs a DMA scheme for data transfer between the memory 5 and the data processor 10. To be specific, the image processing device 1 reads image data from the memory 5 through a DMAR 15, and writes image data into the memory 5 through a DMAW 16.

Figure 2:
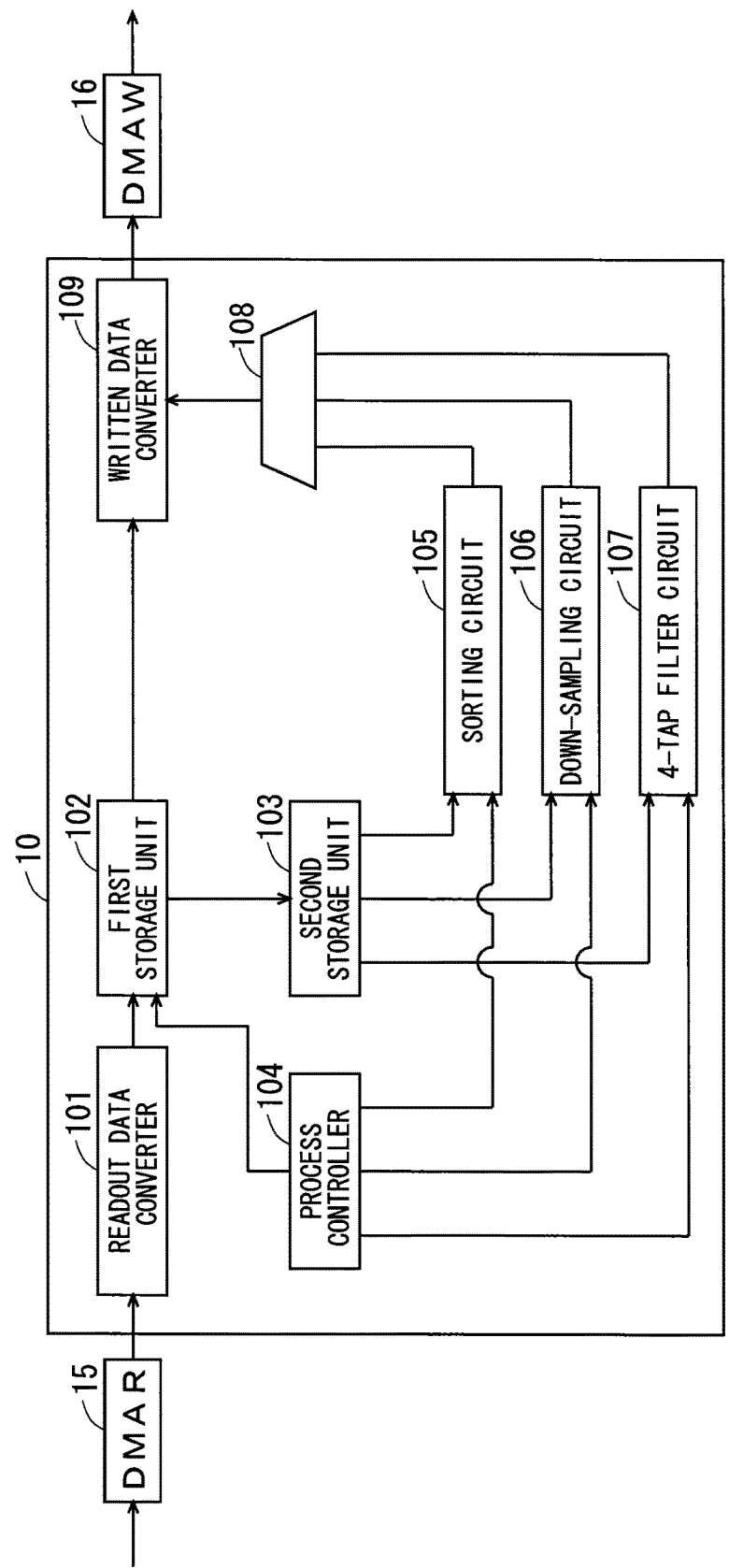
FIG. 2 shows the structure of a data processor.

The structure of the data processor 10 is described next. FIG. 2 shows the structure of the data processor 10.

As shown in FIG. 2, the data processor 10 includes a readout data converter 101, a first storage unit 102, a second storage unit 103, a process controller 104, a sorting circuit 105, a down-sampling circuit 106, a 4-tap filter circuit 107, a selector 108, and a written data converter 109.

The readout data converter 101 converts the format of image data read from the memory 5 through the DMAR 15. More specifically, if pixel information (pixel data) about each component of a pixel is expressed in 8 bits or 12 bits, the readout data converter 101 converts the pixel information about each component to a format in 16 bits and outputs the pixel information. The format of the image data is converted by adding "zeros," for example.

The first storage unit 102 is composed of a semiconductor memory such as an SRAM (static random access memory), for example, and stores image data output from the readout data converter 101.

The second storage unit 103 is composed of a semiconductor memory, for example, and functions as a buffer memory to temporarily store image data read from the first storage unit 102.

The process controller 104 controls each image process performed in the data processor 10. More specifically, the process controller 104 provides the first storage unit 102 with a read control signal used to read pixel data about a pixel targeted for an image process (target pixel). The process controller 104 further provides each of the sorting circuit 105, the down-sampling circuit 106, and the 4-tap filter circuit 107 with an operation control signal used to perform each process.

The sorting circuit 105 has a function of sorting pixel data, and realizes a sorting process such as the plane-sequential to dot-sequential conversion process and the dot-sequential to plane-sequential conversion process, the down-sampling process, the simple magnification process, and the decoded data conversion process.

The down-sampling circuit 106 has a function of decimating pixel information, and realizes the down-sampling process in cooperation with the sorting circuit 105.

The 4-tap filter circuit 107 has a function of making interpolation calculation using pixel data input into the 4-tap filter circuit 107, and realizes the interpolation magnification process.

The selector 108 selects one of pieces of image data output from the sorting circuit 105, the down-sampling circuit 106 and the 4-tap filter circuit 107 (pieces of image data after being subjected to corresponding image processes), and outputs the selected piece of image data.

The written data converter 109 converts the format of image data input from the selector 108, and outputs the converted image data to the DMAW 16. More specifically, the written data converter 109 converts pixel information about each component to a format in 8 bits or 12 bits, and outputs the converted pixel information. Or, the written data converter 109 outputs pixel information in 16 bits as it is without converting the same.

[1-2. Operation (Sorting Process)]

The operation of the image processing device 1 is described next. The image processing device 1 performs three operations using the sorting circuit 105, the down-sampling circuit 106 and the 4-tap filter circuit 107 respectively. These operations are individually described in order below.

First, the operation of the image processing device 1 using the sorting circuit 105 is briefly explained. FIG. 3 briefly explains the operation of the image processing device 1 using the sorting circuit 105.

As shown in FIG. 3, the process controller 104 provides the first storage unit 102 with a read control signal SG1 used to read pixel data about a target pixel, and provides the sorting circuit 105 with an operation control signal SG2 containing an output selection coefficient (sorting coefficient) and an output instruction. In response to the read control signal SG1, the first storage unit 102 reads the pixel data about the target pixel and outputs the read pixel data to the second storage unit 103.

The second storage unit 103 is configured as buffers in columns composed of a plurality of series-connected buffer memories (storage units) B1 to B4. In the second storage unit 103, pixel data stored in a buffer memory is transferred to a buffer memory in a subsequent column according to the FIFO scheme.

As an example, pixel data about a target pixel read from the first storage unit 102 is stored in the first buffer memory B1, and is then transferred to the second buffer memory B2 in a 111 subsequent column in response to input of new pixel data.

Each of the buffer memories B1 to B4 has a capacity capable of storing 64-bit data. Each of the buffer memories B1 to B4 is divided into four storage areas in units of 16 bits, so that the second storage unit 103 as a whole includes 16 storage areas R1 to R16. The storage areas R1 to R16 are given their unique addresses. As an example, as shown in FIG. 3, the four storage areas R1 to R4 in the first buffer memory B1 are given addresses "0" to "3" respectively, and the four storage areas R13 to R16 in the fourth buffer memory B4 are given addresses "12" to "15" respectively.

Each pixel data stored in each of the storage areas R1 to R16 is output to the sorting circuit 105.

FIG. 3 shows buffers in four columns composed of the series-connected four buffer memories B1 to B4. Meanwhile, the buffer memories shown in FIG. 3 are not all the buffer memories, and the second storage unit 103 may be composed of more buffer memories.

The sorting circuit 105 includes four multiplexers MX1 to MX4, and an output buffer memory SB1.

Each of the multiplexers MX1 to MX4 is capable of receiving pixel data stored in each of the 16 storage areas R1 to R16. Each of the multiplexers MX1 to MX4 functions as a selection unit to select one from 16 pieces of pixel data and output the selected piece of pixel data based on the operation control signal SG2. As an example, if the operation control signal SG2 contains an output selection coefficient "8904" in hexadecimal format as shown in FIG. 3, the first multiplexer MX1 outputs a piece of pixel data from the storage area R9 with address "8," and the second multiplexer MX2 outputs a piece of pixel data from the storage area R10 with address "9." Further, the third multiplexer MX3 outputs a piece of pixel data from the storage area R1 with address "0," and the fourth multiplexer MX4 outputs a piece of pixel data from the storage area R5 with address "4."

Like the buffer memories B1 to B4, the output buffer memory SB1 is divided into four storage areas SR1 to SR4 in units of 16 bits, and the storage areas SR1 to SR4 store pieces of pixel data output from the multiplexers MX1 to MX4 respectively.

Figure 4:
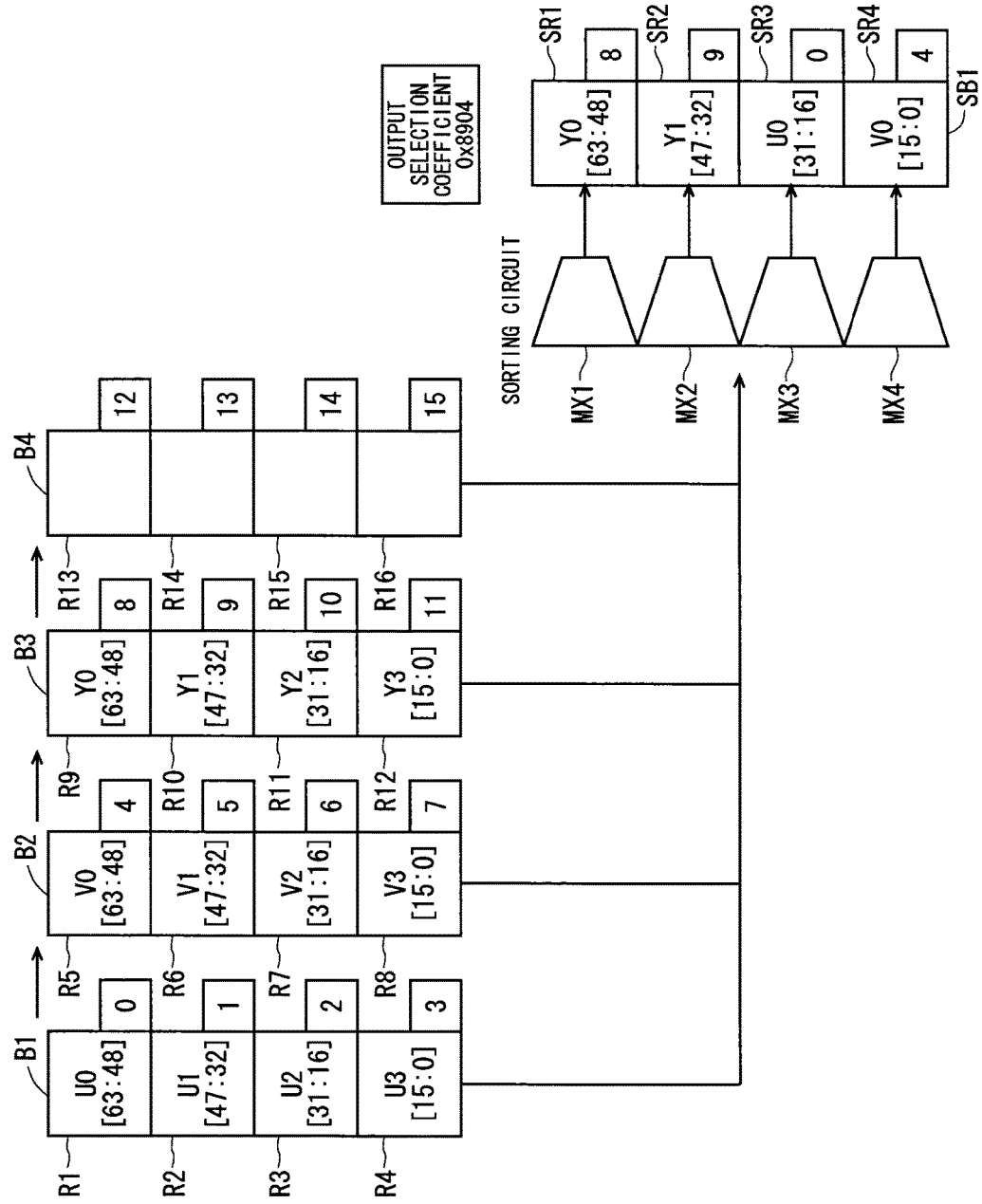
FIGS. 4 and 5 each show an example of a plane-sequential to dot-sequential conversion process.
Figure 5:
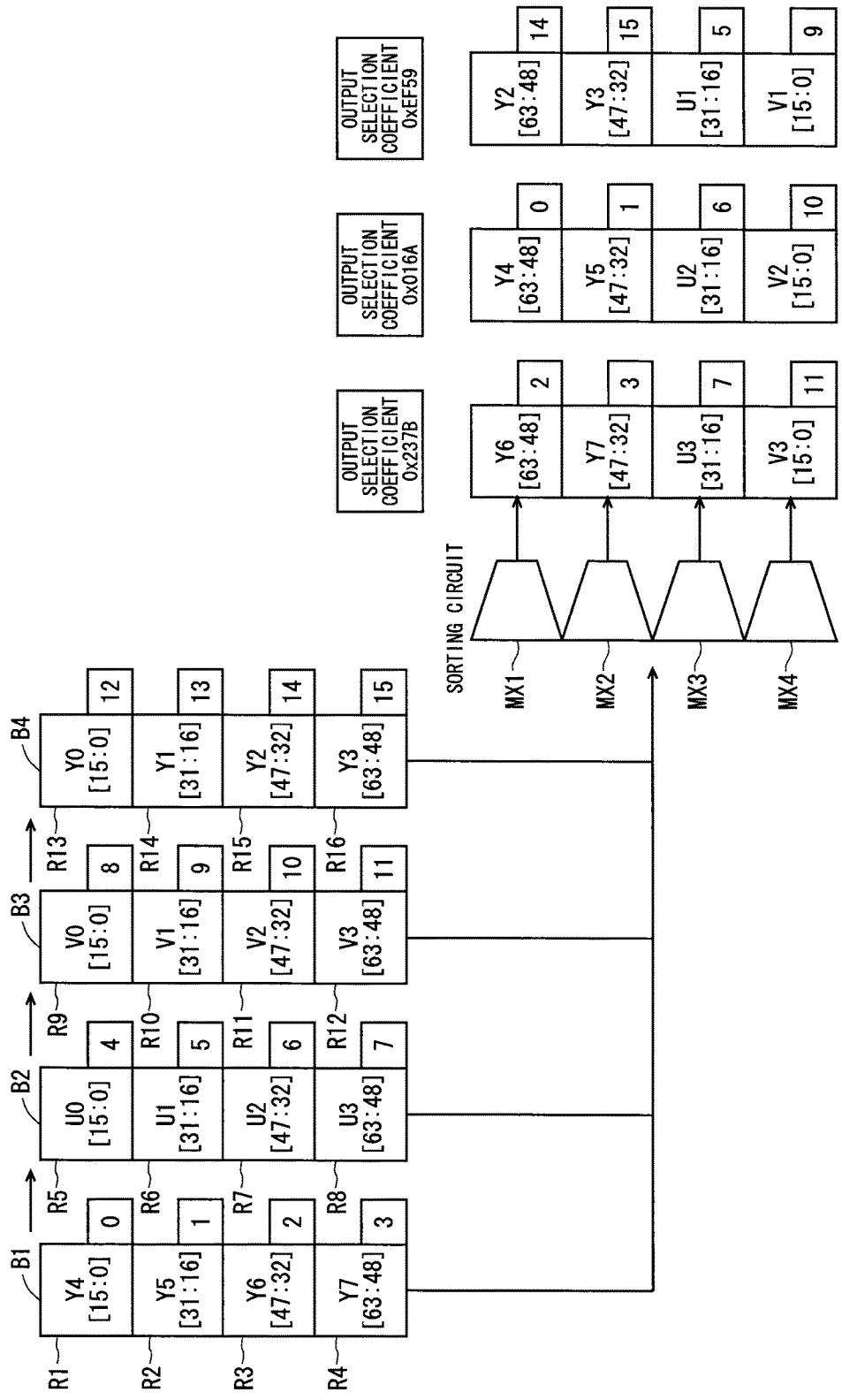

It will be described next in more detail how the image processing device 1 operates by using the sorting circuit 105 to perform the plane-sequential to dot-sequential conversion process on image data in YUV422 format, for example. FIGS. 4 and 5 each show an example of the plane-sequential to dot-sequential conversion process.

FIG. 4 is based on the assumption that, when plane-sequential pixel data in YUV422 format is read from the first storage unit 102, pieces of pixel data Y0 to Y3 about a luminance signal "Y" are stored in the third buffer memory B3, pieces of pixel data V0 to V3 about a color difference signal "V" are stored in the second buffer memory B2, and pieces of pixel data U0 to U3 about a color difference signal "U" are stored in the first buffer memory B1.

In this case, when an output selection coefficient "8904" is input from the process controller 104 into the sorting circuit 105, the first multiplexer MX1 outputs the piece of pixel data Y0 from the storage area R9 with address "8," and the second multiplexer MX2 outputs the piece of pixel data Y1 from the storage area R10 with address "9." Further, the third multiplexer MX3 outputs the piece of pixel data U0 from the storage area R1 with address "0," and the fourth multiplexer MX4 outputs the piece of pixel data V0 from the storage area R5 with address "4."

As a result, dot-sequential pixel data in YUV422 format is stored in the output buffer memory SB1. In response to an output instruction in the operation control signal SG2, the dot-sequential pixel data in YUV422 format is output from the sorting circuit 105.

When the operation proceeds further and pieces of pixel data Y4 to Y7 about the luminance signal "Y" are newly read from the first storage unit 102, pieces of pixel data are stored in the second storage unit 103 in a way as shown in FIG. 5. To be specific, the pieces of pixel data Y0 to Y3 about the luminance signal "Y" are stored in the fourth buffer memory B4, the pieces of pixel data V0 to V3 about the color difference signal "V" are stored in the third buffer memory B3, the pieces of pixel data U0 to U3 about the color difference signal "U" are stored in the second buffer memory B2, and the pieces of pixel data Y4 to Y7 about the luminance signal "Y" are stored in the first buffer memory B1.

When an output selection signal "EF59" is input in this condition into the sorting circuit 105, the first multiplexer MX1 outputs the piece of pixel data Y2 from the storage area R15 with address "14," and the second multiplexer MX2 outputs the piece of pixel data Y3 from the storage area R16 with address "15." Further, the third multiplexer MX3 outputs the piece of pixel data U1 from the storage area R6 with address "5," and the fourth multiplexer MX4 outputs the piece of pixel data V1 from the storage area R10 with address "9."

Next, when an output selection signal "016A" is input into the sorting circuit 105, the first multiplexer MX1 outputs the piece of pixel data Y4 from the storage area R1 with address "0," and the second multiplexer MX2 outputs the piece of pixel data Y5 from the storage area R2 with address "1." Further, the third multiplexer MX3 outputs the piece of pixel data U2 from the storage area R7 with address "6," and the fourth multiplexer MX4 outputs the piece of pixel data V2 from the storage area R11 with address "10."

Next, when an output selection signal "237B" is input into the sorting circuit 105, the first multiplexer MX1 outputs the piece of pixel data Y6 from the storage area R3 with address "2," and the second multiplexer MX2 outputs the piece of pixel data Y7 from the storage area R4 with address "3." Further, the third multiplexer MX3 outputs the piece of pixel data U3 from the storage area R8 with address "7," and the fourth multiplexer MX4 outputs the piece of pixel data V3 from the storage area R12 with address "11."

As described above, when the process controller 104 converts plane-sequential image data to dot-sequential image data, the process controller 104 makes the first storage unit 102 output part of the plane-sequential image data such that pieces of pixel data about all components of the same pixel are stored in the second storage unit 103. The process controller 104 further makes the sorting circuit 105 output pixel data such that pieces of pixel data about all components are output together in units of pixels.

Figure 6:
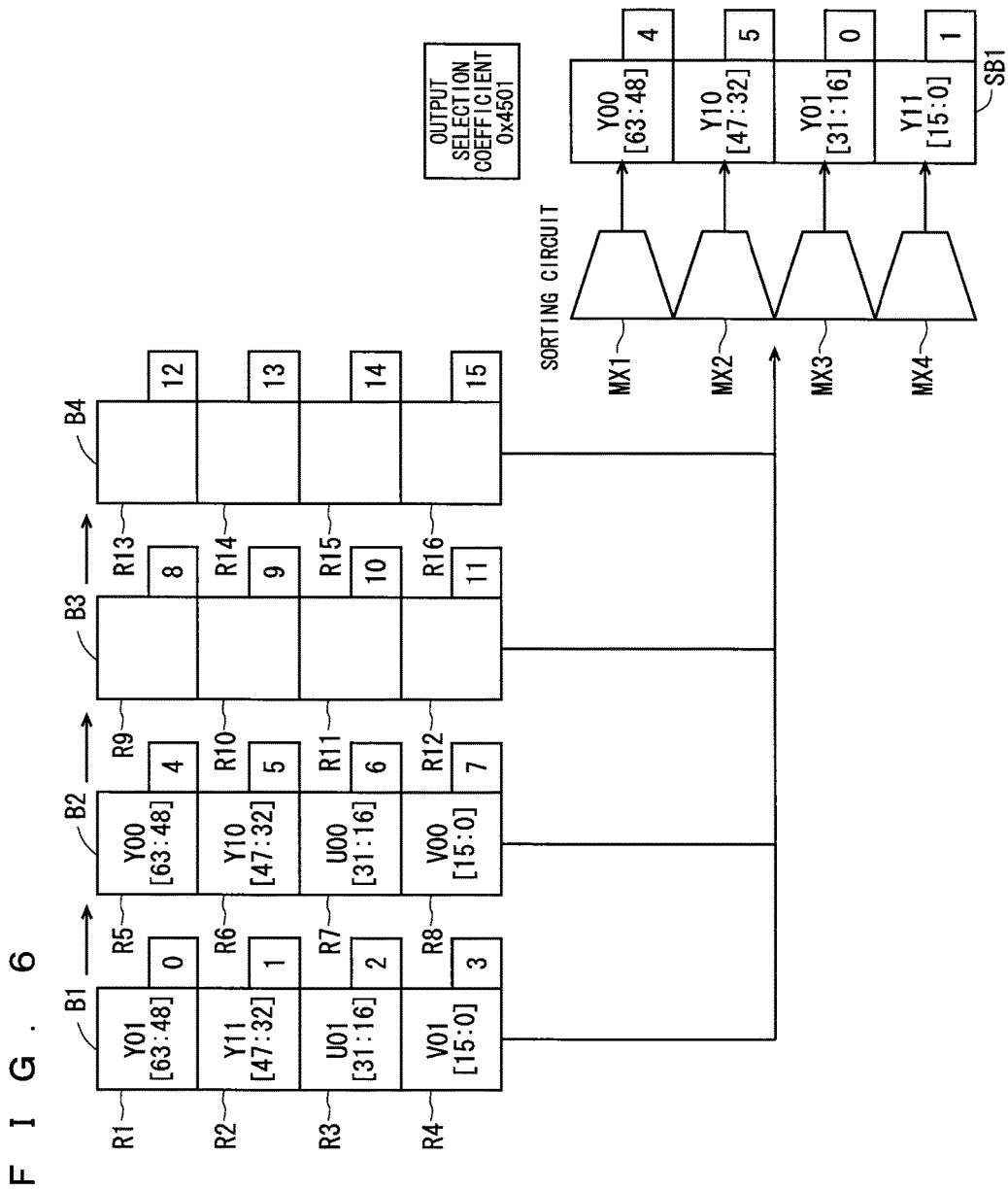
FIG. 6 shows an example of a dot-sequential to plane-sequential conversion process.

It will be described next in more detail how the image processing device 1 operates by using the sorting circuit 105 to perform the dot-sequential to plane-sequential conversion process on image data in YUV422 format, for example. FIG. 6 shows an example of the dot-sequential to plane-sequential conversion process.

FIG. 6 is based on the assumption that, when dot-sequential pieces of pixel data in YUV422 are read from the first storage unit 102, a group of dot-sequential pieces of pixel data Y00, Y10, U00 and V00 are stored in the second buffer memory B2, and a different group of dot-sequential pieces of pixel data Y01, Y11, U01 and V01 are stored in the first buffer memory B1.

In this case, when an output selection coefficient "4501" is input from the process controller 104 into the sorting circuit 105, the first multiplexer MX1 outputs the piece of pixel data Y00 from the storage area R5 with address "4," and the second multiplexer MX2 outputs the piece of pixel data Y10 from the storage area R6 with address "5." Further, the third multiplexer MX3 outputs the piece of pixel data Y01 from the storage area R1 with address "0," and the fourth multiplexer MX4 outputs the piece of pixel data Y11 from the storage area R2 with address "1."

As a result, plane-sequential pixel data in YUV422 format is stored in the output buffer memory SB1. In response to an output instruction in the operation control signal SG2, the plane-sequential pixel data in YUV422 format is output from the sorting circuit 105.

The image processing device 1 realizes sorting process such as the plane-sequential to dot-sequential conversion process and the dot-sequential to plane-sequential conversion process using the sorting circuit 105.

As described above, when the process controller 104 converts dot-sequential image data to plane-sequential image data, the process controller 104 makes the first storage unit 102 output part of the dot-sequential image data such that pieces of pixel data about all components of two or more successive pixels are stored in the second storage unit 103. The process controller 104 further makes the sorting circuit 105 output pixel data such that pieces of pixel data about the same type of component output together.

In summary, the image processing device 1 includes: the first storage unit 102 to store image data containing pieces of pixel data about a plurality of components of each pixel arranged according to a first rule; the second storage unit 103 having a plurality of storage areas R1 to R16 to individually store the image data read from the first storage unit 102 for each of the pieces of pixel data; the process controller 104 to control reading of the image data from the first storage unit 102 to the second storage unit 103 and to output the operation control signal SG2 containing an output selection coefficient used to designate a specific storage area being one of the storage areas R1 to R16; and the multiplexers MX1 to MX4. The multiplexers MX1 to MX4 output pixel data in order according to a second rule by selecting, based on the operation control signal SG2, a piece of pixel data stored in the specific storage area out of the pieces of pixel data stored in the storage areas R1 to R16.

The image processing device 1 of the aforementioned structure controls image data to be stored in the second storage unit 103 appropriately according to a type of sorting process, and outputs an output selection coefficient appropriately responsive to the type of sorting process. In doing so, the image processing device 1 of this structure is allowed to perform plane-sequential to dot-sequential conversion and dot-sequential to plane-sequential conversion.

[1-3. Down-Sampling Process]

Figure 7:
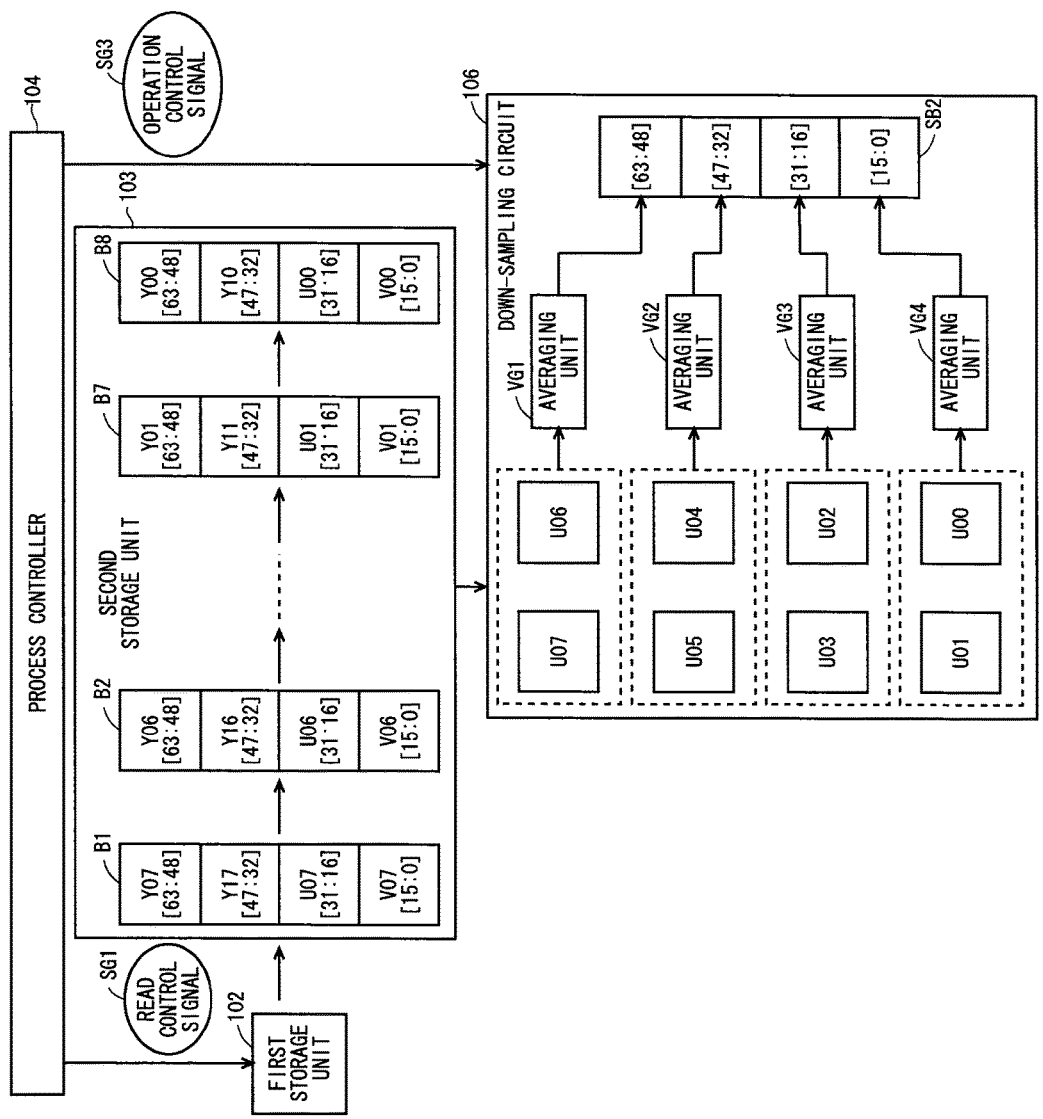
FIGS. 7 and 8 each explain the operation of the image processing device using a down-sampling circuit.
Figure 8:
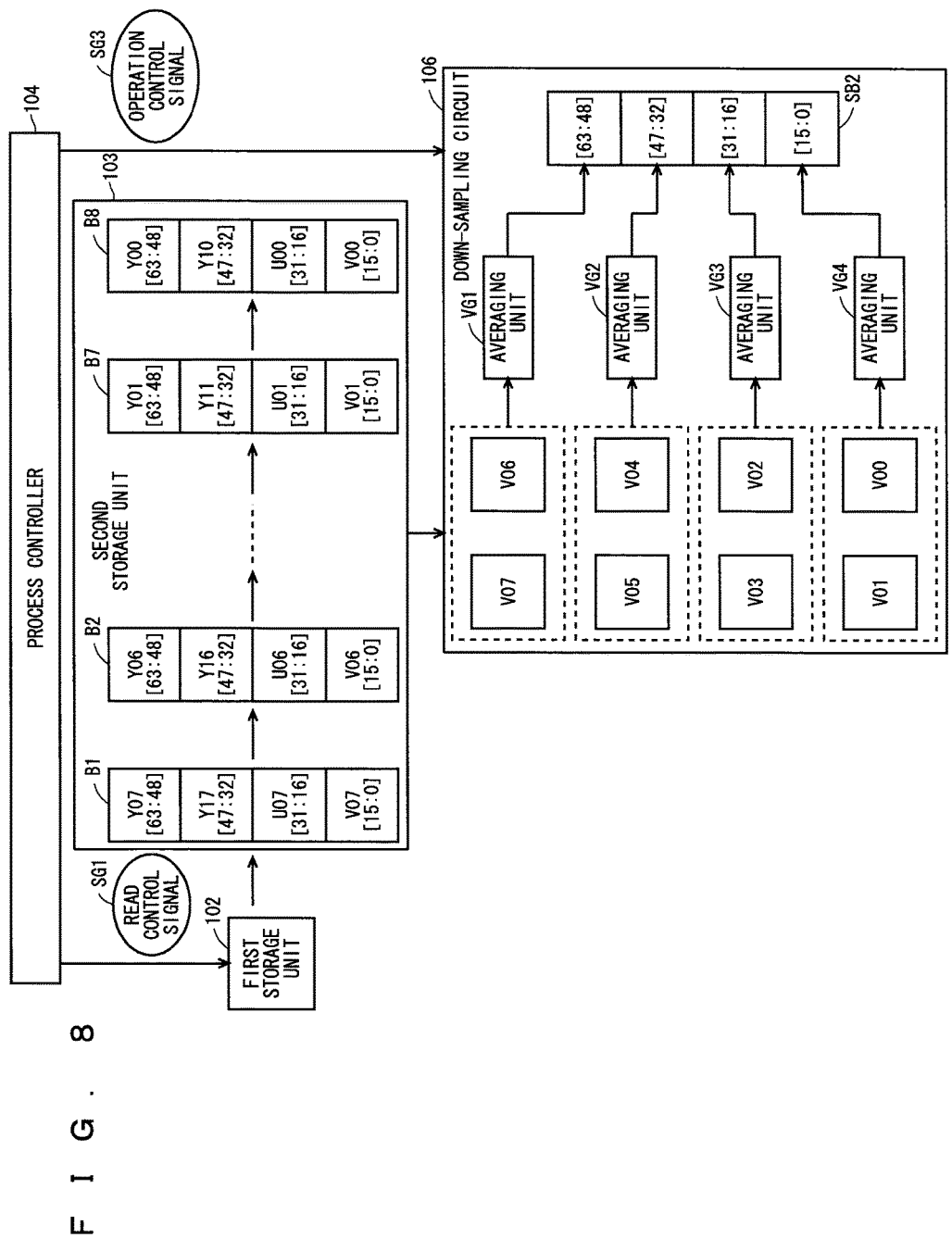

The operation of the image processing device 1 using the down-sampling circuit 106 is described next. Here, it will be described in more detail how the image processing device 1 operates by using the down-sampling circuit 106 to convert dot-sequential image data in YUV422 format to plane-sequential image data in YUV411, for example. FIGS. 7 and 8 each show an example of the operation using the down-sampling circuit 106.

As shown in FIG. 7, the process controller 104 provides the first storage unit 102 with a read control signal SG1 used to pixel data about a target pixel, and provides the down-sampling circuit 106 with an operation control signal SG3. In response to the read control signal SG1, the first storage unit 102 reads the pixel data about the target pixel and outputs the read pixel data to the second storage unit 103.

The second storage unit 103 stores the pixel data about the target pixel read from the first storage unit 102 into buffer memories. In FIG. 7, buffers in eight columns composed of series-connected eight buffer memories B1 to B8 are shown, and each of the buffer memories B1 to B8 stores dot-sequential image data in YUV422 format.

The down-sampling circuit 106 includes four averaging units VG1 to VG4, and an output buffer memory SB2.

Each of the averaging units VG1 to VG4 has a function of taking the average of two received pieces of pixel data and outputting the average of the two pieces of pixel data.

Each of the averaging units VG1 to VG4 receives pieces of pixel data about the same type of color difference component, and calculates the average of the pieces of pixel data about the same type of color difference component. As an example, FIG. 7 shows that pieces of pixel data U00 to U07 about a color difference signal "U" are input into the averaging units VG1 to VG4. To be specific, the averaging unit VG1 receives the pieces of pixel data "U07" and "U06" about the color difference signal "U," and outputs the average of the two pieces of pixel data "U07" and "U06" to the output buffer memory SB2. The averaging unit VG2 receives the pieces of pixel data "U05" and "U04" about the color difference signal "U," and outputs the average of the two pieces of pixel data "U05" and "U04" to the output buffer memory SB2. The averaging unit VG3 receives the pieces of pixel data "U03" and "U02" about the color difference signal "U," and outputs the average of the two pieces of pixel data "U03" and "U02" to the output buffer memory SB2. The averaging unit VG4 receives the pieces of pixel data "U01" and "U00" about the color difference signal "U," and outputs the average of the two pieces of pixel data "U01" and "U00" to the output buffer memory SB2.

As a result, plane-sequential pixel data about the color difference signal "U" is stored in the output buffer memory SB2. In response to the operation control signal SG3, the plane-sequential pixel data about the color difference signal "U" is output from the down-sampling circuit 106.

A multiplexer can be used to sample pixel data about a color difference component from the second storage unit 103. If a multiplexer is used to sample pixel data of the same type of color difference component, the process controller 104 outputs the operation control signal SG3 containing an output selection coefficient. The multiplexer outputs, to an averaging unit, pixel data stored in a storage area with an address designated by the output selection coefficient. Each of the averaging units VG1 to VG4 is to receive two pieces of pixel data, so that two multiplexers are prepared for each averaging unit.

Pixel data about a color difference signal "V" is subjected to the same process. FIG. 8 shows that pieces of pixel data about the color difference signal "V" are input into the averaging units VG1 to VG4.

More specifically, the averaging unit VG1 receives pieces of pixel data "V07" and "V06" about the color difference signal "V," and outputs the average of the two pieces of pixel data "V07" and "V06" to the output buffer memory SB2. The averaging unit VG2 receives pieces of pixel data "V05" and "V04" about the color difference signal "V," and outputs the average of the two pieces of pixel data "V05" and "V04" to the output buffer memory SB2. The averaging unit VG3 receives pieces of pixel data "V03" and "V02" about the color difference signal "V," and outputs the average of the two pieces of pixel data "V03" and "V02" to the output buffer memory SB2. The averaging unit VG4 receives pieces of pixel data "V01" and "V00" about the color difference signal "V," and outputs the average of the two pieces of pixel data "V01" and "V00" to the output buffer memory SB2.

As a result, plane-sequential pixel data about the color difference signal "V" is stored in the output buffer memory SB2. In response to the operation control signal SG3, the plane-sequential pixel data about the color difference signal "V" is output from the down-sampling circuit 106.

Pixel data about a luminance signal "Y" is sorted in the aforementioned manner by using the sorting circuit 105, thereby generating plane-sequential pixel data about the luminance signal "Y."

As described above, down-sampled plane-sequential pixel data about a color difference component is acquired from the down-sampling circuit 106, and plane-sequential pixel data about a luminance component is acquired from the sorting circuit 105. To be specific, dot-sequential image data in YUV422 format is converted to plane-sequential image data in YUV411 format by using the sorting circuit 105 and the down-sampling circuit 106.

In summary, in the down-sampling process, the process controller 104 makes the first storage unit 102 output part of image data such that pieces of pixel data about the same type of component (here, color difference component) of successive pixels are stored in the second storage unit 103. The process controller 104 further makes the second storage unit 103 output, to each of the averaging units VG1 to VG4, pieces of pixel data about the same type of component of two successive pixels. Then, each of the averaging units VG1 to VG4 outputs the average of the pieces of pixel data about the same type of component of the two successive pixels as pixel data about the same type of component common to these two successive pixels.

The image processing device 1 uses part of the structure responsible for the sorting process (first and second storage units 102 and 103) for the down-sampling process. Sharing part of the structure between different image processes allows reduction of the circuit size of the image processing device 1, compared to the case where different structures are prepared for corresponding image processes.

[1-4. Interpolation Magnification Process]

Figure 9:
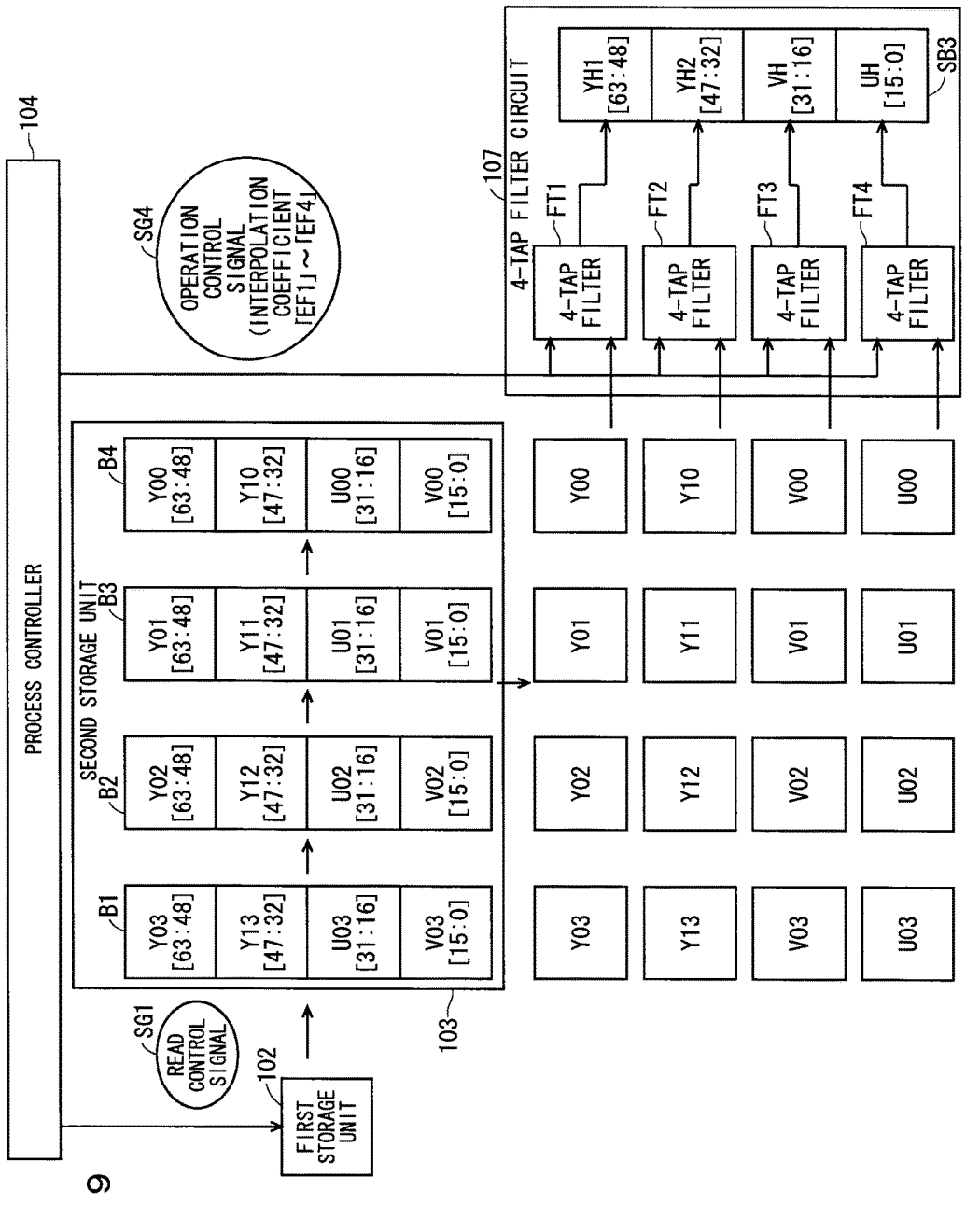
FIG. 9 explains the operation of the image processing device using a 4-tap filter circuit.

The operation of the image processing device 1 using the 4-tap filter circuit 107 is described next. FIG. 9 shows the operation using the 4-tap filter circuit 107.

As shown in FIG. 9, the process controller 104 provides the first storage unit 102 with a read control signal SG1 used to read pixel data about a target pixel, and provides the 4-tap filter circuit 107 with an operation control signal SG4 containing interpolation coefficients "EF1" to "EF4." In response to the read control signal SG1, the first storage unit 102 reads the pixel data about the target pixel and outputs the read pixel data to the second storage unit 103.

The second storage unit 103 stores the pixel data about the target pixel read from the first storage unit 102 into buffer memories. In FIG. 9, buffers in four columns composed of series-connected four buffer memories B1 to B4 are shown, and each of the buffer memories B1 to B4 stores dot-sequential image data in YUV422 format.

The 4-tap filter circuit 107 includes four 4-tap filters FT1 to FT4, and an output buffer memory SB3.

Based on four pieces of pixel data "PD1" to "PD4" about the same component input from the buffer memories B1 to B4 and the interpolation coefficients "EF1" to "EF4" in the operation control signal SG4, each of the 4-tap filters FT1 to FT4 makes interpolation calculation according to the following formula (1), thereby functioning as an interpolation calculation unit to calculate pixel data "NP" about an interpolated pixel.

$$NP=EF1\times PD1+EF2\times PD2+EF3\times PD3+EF4\times PD4$$

As an example, FIG. 9 shows that pieces of pixel data Y00 to Y03 about a luminance signal "Y" are input as pieces of pixel data about the same component into the first 4-tap filter FT1. The first 4-tap filter FT1 makes the calculation according to the foregoing formula (1) using the pieces of pixel data Y00 to Y03 and the interpolation coefficients "EF1" to "EF4" to calculate a piece of pixel data YH1 about an interpolated pixel relating to the luminance signal "Y," and outputs the piece of pixel data YH1 to the output buffer memory SB3.

FIG. 9 also shows that pieces of pixel data Y10 to Y13 about the luminance signal "Y" are input as pieces of pixel data about the same component into the second 4-tap filter FT2. The second 4-tap filter FT2 makes the calculation according to the foregoing formula (1) using the pieces of pixel data Y10 to Y13 and the interpolation coefficients "EF1" to "EF4" to calculate a piece of pixel data YH2 about the interpolated pixel relating to the luminance signal "Y," and outputs the piece of pixel data YH2 to the output buffer memory SB3.

FIG. 9 also shows that pieces of pixel data V00 to V03 about a luminance signal "V" are input as pieces of pixel data about the same component into the third 4-tap filter FT3. The third 4-tap filter FT3 makes the calculation according to the foregoing formula (1) using the pieces of pixel data V00 to V03 and the interpolation coefficients "EF1" to "EF4" to calculate a piece of pixel data VH about the interpolated pixel relating to the luminance signal "V," and outputs the piece of pixel data VH to the output buffer memory SB3.

FIG. 9 further shows that pieces of pixel data U00 to U03 about a luminance signal "U" are input as pieces of pixel data about the same component into the fourth 4-tap filter FT4. The fourth 4-tap filter FT4 makes the calculation according to the foregoing formula (1) using the pieces of pixel data U00 to U03 and the interpolation coefficients "EF1" to "EF4" to calculate a piece of pixel data UH about the interpolated pixel relating to the luminance signal "U," and outputs the piece of pixel data UH to the output buffer memory SB3.

As a result, dot-sequential pixel data in YUV422 format about an interpolated pixel is stored in the output buffer memory SB3. In response to an output instruction in the operation control signal SG4, the pixel data about the interpolated pixel is output from the 4-tap filter circuit 107.

As described above, the 4-tap filter circuit 107 acquires pixel data about an interpolated pixel. Meanwhile, the number of interpolated pixels, about which pieces of pixel data are to be acquired, changes according to a magnification factor of image data. For magnification of image data by 5/4 times, for example, pieces of pixel data about five interpolated pixels are acquired based on pieces of pixel data about four pixels. In this case, for calculation of the pieces of pixel data about the five interpolated pixels, the process controller 104 sequentially outputs five sets of interpolation coefficients each composed of the interpolation coefficients "EF1" to "EF4." To be specific, the process controller 104 outputs one set of the interpolation coefficients "EF1" to "EF4" to acquire one interpolated pixel, and the 4-tap filter circuit 107 calculates pixel data about one interpolated pixel by using one set of the interpolation coefficients "EF1" to "EF4."

In summary, for the interpolation magnification process, the process controller 104 makes the first storage unit 102 output part of image data such that pieces of pixel data about the same type of component of two or more successive pixels are stored in the second storage unit 103. The process controller 104 further makes the second storage unit 103 output, to each of the 4-tap filters FT1 to FT4, pieces of pixel data about the same type of component of two or more successive pixels, and outputs the interpolation coefficients "EF1" to "EF4" to each of the 4-tap filters FT1 to FT4. Then, each of the 4-tap filters FT1 to FT4 outputs pixel data about an interpolated pixel calculated by using the pieces of pixel data about the same type of component of the two or more successive pixels and the interpolation coefficients "EF1" to "EF4."

The image processing device 1 uses part of the structure responsible for the sorting process (first and second storage units 102 and 103) for the interpolation magnification process. Sharing part of the structure between different image processes allows reduction of the circuit size of the image processing device 1, compared to the case where different structures are prepared for corresponding image processes.

[1-5. Applied Processes]

Applied processes using the sorting circuit 105 are described next. The applied processes include the simple magnification process and the decoded data conversion process.

Figure 10:
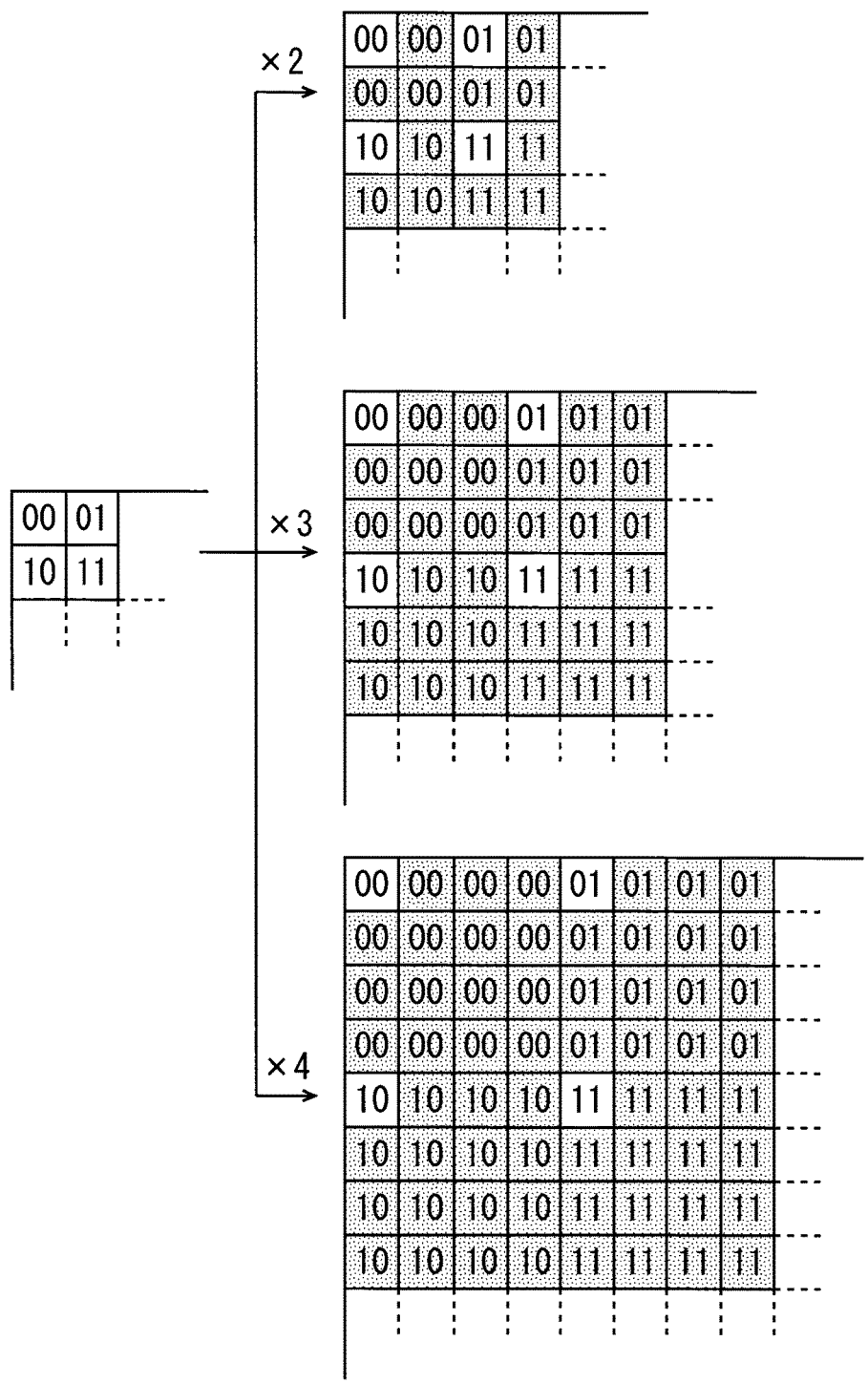
FIG. 10 briefly shows a simple magnification process.

The simple magnification process is realized by copying. FIG. 10 briefly shows the simple magnification process.

As shown in FIG. 10, in the simple magnification process, each piece of pixel data is increased according to a magnification factor. By way of example, if a magnification factor is 2, the number of pixels in a horizontal line and that of pixels in a vertical line are both doubled. Further, the respective numbers of pixels in the horizontal and vertical lines are tripled if a magnification factor is 3, and the respective numbers of pixels in the horizontal and vertical lines are quadrupled if a magnification factor is 4.

Figure 11:
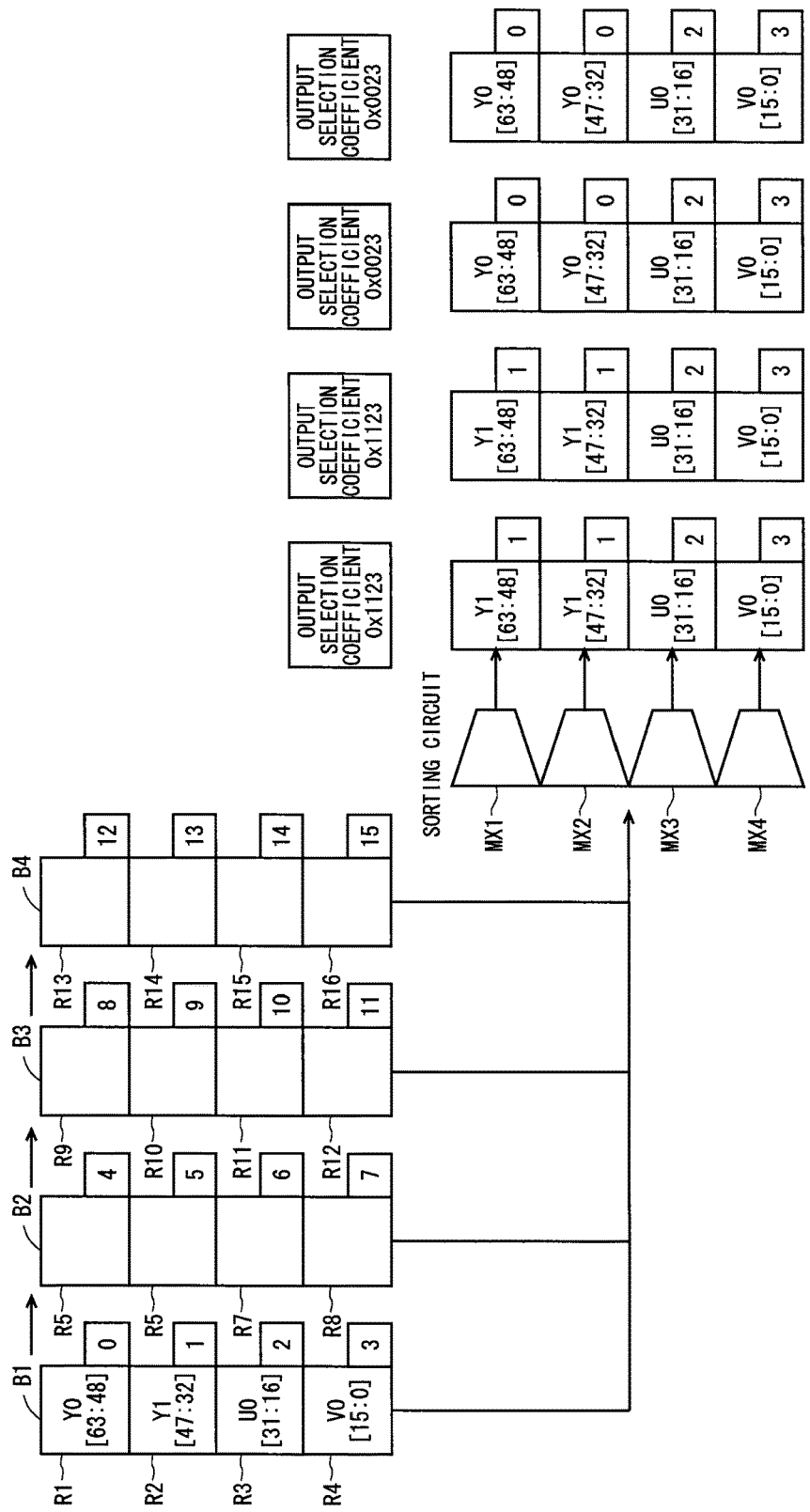
FIG. 11 shows an example of the simple magnification process.

It will be described next how the aforementioned simple magnification process works to double dot-sequential image data in YUV422 format, for example. FIG. 11 shows an example of the simple magnification process.

FIG. 11 is based on the assumption that dot-sequential pieces of pixel data Y0, Y1, U0 and V0 in a group are stored in the first buffer memory B1 in response to reading of dot-sequential pixel data in YUV422 format from the first storage unit 102.

In this case, when an output selection coefficient "0023" is input from the process controller 104 into the sorting circuit 105, the first multiplexer MX1 outputs the piece of pixel data Y0 from the storage area R1 with address "0," and the second multiplexer MX2 outputs the piece of pixel data Y0 from the storage area R1 with address "0." Further, the third multiplexer MX3 outputs the piece of pixel data U0 from the storage area R3 with address "2," and the fourth multiplexer MX4 outputs the piece of pixel data V0 from the storage area R4 with address "3."

As a result, the dot-sequential pieces of pixel data Y0, Y0, U0 and V0 in a group are stored in the output buffer memory SB1. In response to an output instruction in the operation control signal SG2, the dot-sequential pieces of pieces of pixel data Y0, Y0, U0 and V0 in a group are output from the sorting circuit 105.

The dot-sequential pieces of pixel data Y0, Y0, U0 and V0 in a group correspond to two pixels. Thus, the same output selection coefficient "0023" is input again from the process controller 104 into the sorting circuit 105. Then, the sorting circuit 105 performs the same operation to store the dot-sequential pieces of pixel data Y0, Y0, U0 and V0 in a group into the output buffer memory SB1.

As described above, for doubling of image data, the same output selection coefficient "0023" is input twice into the sorting circuit 105, thereby generating two groups of the dot-sequential pieces of pixel data Y0, Y0, U0 and V0.

The dot-sequential pieces of pixel data Y0, Y1, U0 and V0 in a group stored in the first buffer memory B1 are also targeted for output in response to an output selection coefficient "1123" input into the sorting circuit 105 twice, thereby generating two groups of the dot-sequential pieces of pixel data Y1, Y1, U0 and V0.

In summary, for the simple magnification process, the process controller 104 makes the first storage unit 102 outputs part of image data such that pieces of pixel data about all components of the same pixel are stored in the second storage unit 103. Further, the process controller 104 outputs the same control signal several times according to a magnification factor. Based on the same control signal input into the sorting circuit 105 several times, the sorting circuit 105 outputs pixel data about each component of the same pixel several times.

The image processing device 1 uses the structure responsible for the sorting process for the simple magnification process. Sharing the structure between different image processes allows reduction of the circuit size of the image processing device 1, compared to the case where different structures are prepared for corresponding image processes.

Figure 12:
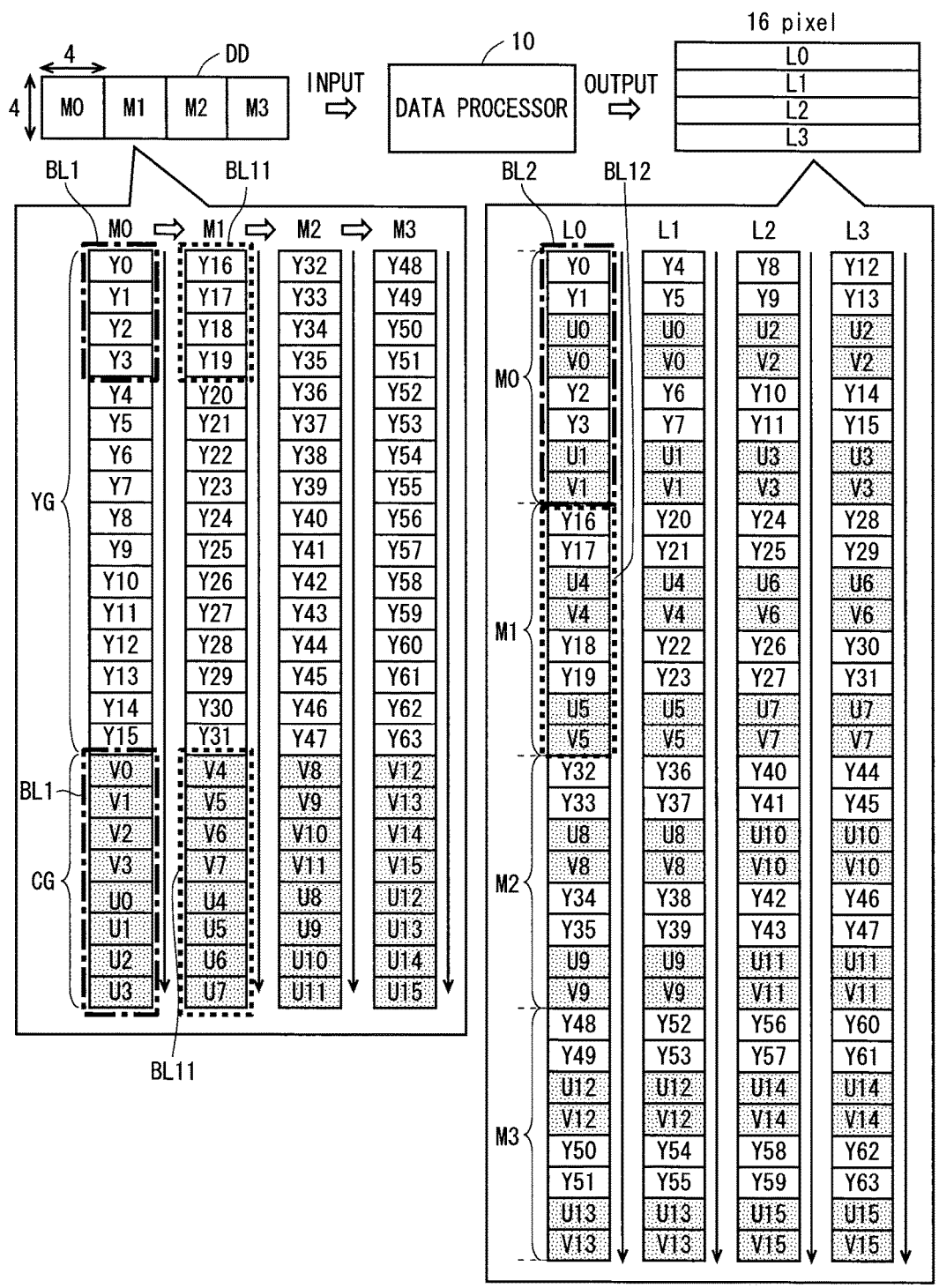
FIG. 12 briefly shows a decoded data conversion process.

The decoded data conversion process is a process of converting data after being subjected to a video compression process to dot-sequential data in YUV422 format. FIG. 12 briefly shows the decoded data conversion process.

Decoded data targeted for the decoded data conversion process is output in units of macro blocks from a compression processing module (not shown in the drawings) to perform the video compression process. The compression processing module compresses video data into H.264 format, for example. The compression processing module may compress video data into a different format such as MPEG (moving picture experts group).

FIG. 12 shows decoded data DD output from the compression processing module. The decoded data DD includes four macro blocks M0 to M3 each composed of 4×4 pixels.

Each of the macro blocks M0 to M3 includes a pixel data group YG about a luminance signal "Y," and a pixel data group CG about color difference signals "U" and "V" that are arranged separately in units of macro blocks.

When the aforementioned decoded data DD is input into the data processor 10, the data processor 10 performs the decoded data conversion process on the decoded data DD and outputs pieces of image data L0 to L3 in units of lines sequentially. Each of the pieces of image data L0 to L3 in units of lines is a piece of dot-sequential data in YUV422 format.

Figure 13:
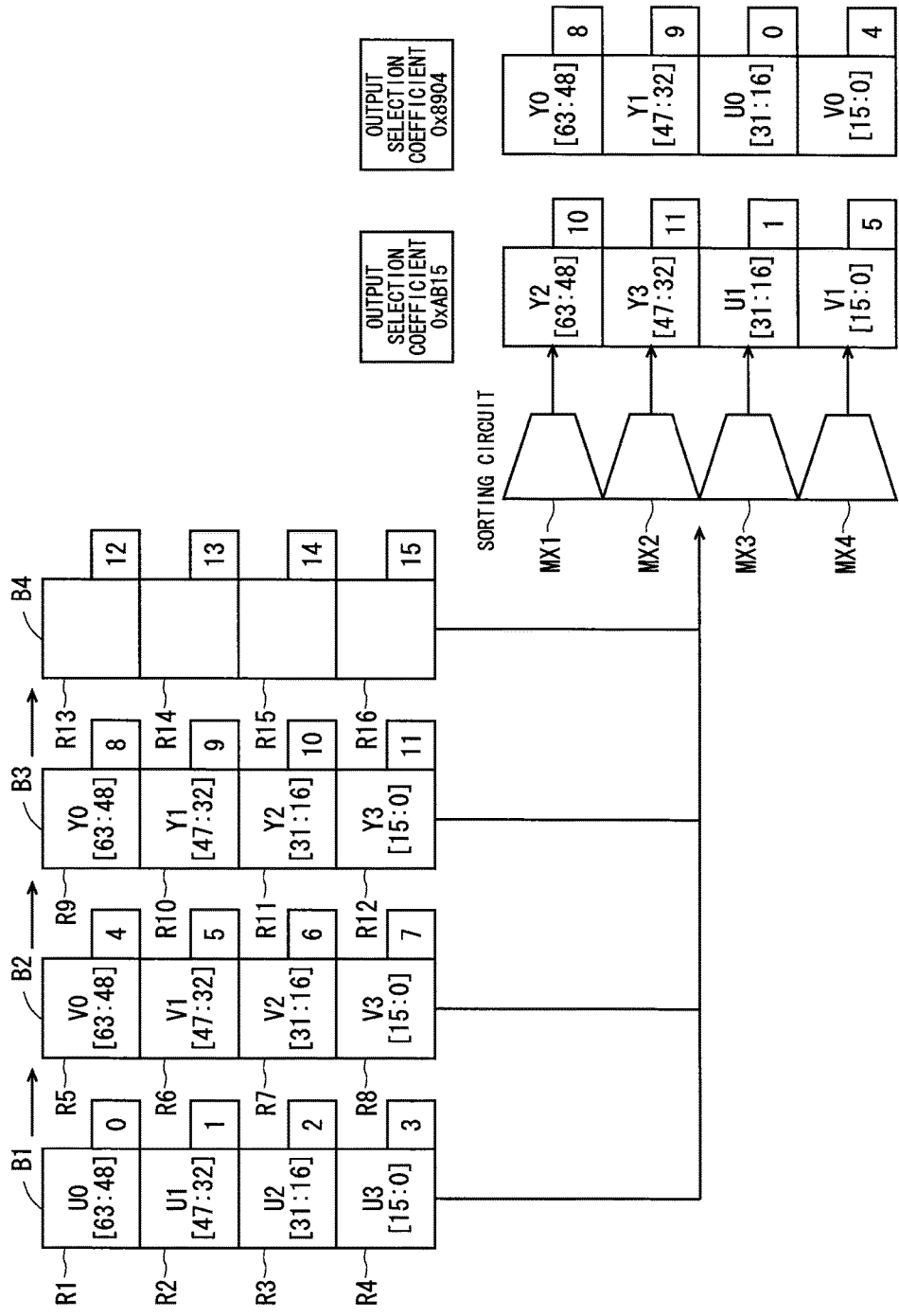
FIG. 13 shows an example of the decoded data conversion process.

The decoded data conversion process is described in detail below. FIG. 13 shows an example of the decoded data conversion process.

The decoded data DD input into the data processor 10 is stored in the first storage unit 102.

Next, for execution of the decoded data conversion process, decoded data about a target pixel is read from the first storage unit 102 and then stored in the second storage unit 103. First, it is assumed that pieces of pixel data Y0 to Y3, V0 to V3 and U0 to U3 surrounded by dashed-dotted lines BL1 in the macro block M0 of FIG. 12 are read from the first storage unit 102 and stored in the second storage unit 103. To be specific, in this assumption, the pieces of pixel data Y0 to Y3 about the luminance signal "Y" are stored in the third buffer memory B3 of the second storage unit 103, the pieces of pixel data V0 to V3 about the luminance signal "V" are stored in the second buffer memory B2 of the second storage unit 103, and the pieces of pixel data U0 to U3 about the luminance signal "U" are stored in the first buffer memory B1 of the second storage unit 103.

In this case, when an output selection signal "8904" is input from the process controller 104 into the sorting circuit 105, the first multiplexer MX1 outputs the piece of pixel data Y0 from the storage area R9 with address "8," and the second multiplexer MX2 outputs the piece of pixel data Y1 from the storage area R10 with address "9." Further, the third multiplexer MX3 outputs the piece of pixel data U0 from the storage area R1 with address "0," and the fourth multiplexer MX4 outputs the piece of pixel data V0 from the storage area R5 with address "4."

As a result, the dot-sequential pieces of pixel data Y0, Y1, U0 and V0 in YUV422 format are stored in the output buffer memory SB1. In response to an output instruction in the operation control signal SG2, the dot-sequential pieces of pixel data Y0, Y1, U0 and V0 in YUV422 format are output from the sorting circuit 105.

When an output selection signal "AB15" is input next into the sorting circuit 105, the first multiplexer MX1 outputs the piece of pixel data Y2 from the storage area R11 with address "10," and the second multiplexer MX2 outputs the piece of pixel data Y3 from the storage area R12 with address "11." Further, the third multiplexer MX3 outputs the piece of pixel data U1 from the storage area R2 with address "1," and the fourth multiplexer MX4 outputs the piece of pixel data V1 from the storage area R6 with address "5."

As a result, the dot-sequential pieces of pixel data Y2, Y3, U1 and V1 in YUV422 format are stored in the output buffer memory SB1. In response to an output instruction in the operation control signal SG2, the dot-sequential pieces of pixel data Y2, Y3, U1 and V1 in YUV422 format are output from the data processor 10.

As a result of a serious of the aforementioned operations based on the two output selection coefficients "8904" and "AB15," the pieces of pixel data Y0, Y1, U0 and V0, and the pieces of pixel data Y2, Y3, U1 and V1 output from the data processor 10 become pieces of pixel data surrounded by a dashed-dotted line BL2 in the piece of image data L0 of FIG. 12 in units of lines.

As described above, as a result of the decoded data conversion process on the pieces of pixel data Y0 to Y3, V0 to V3 and U0 to U3 surrounded by the dashed-dotted lines BL1 in the macro block M0 of FIG. 12, the pieces of pixel data surrounded by the dashed-dotted line BL2 are acquired to become part of the piece of image data L0 of FIG. 12 in units of lines.

In a subsequent step of the decoded data conversion process, pieces of pixel data Y16 to Y19, V4 to V7 and U4 to U7 surrounded by dotted lines BL11 in the macro block M1 of FIG. 12 are processed, thereby acquiring pieces of pixel data surrounded by a dotted line BL12 to become part of the piece of image data L0 of FIG. 12 in units of lines. Then, the decoded data conversion process is performed sequentially while a target of the process is changed, thereby sequentially acquiring the piece of image data L0 to L3 in units of lines.

In summary, in the decoded data conversion process, the process controller 104 makes the first storage unit 102 output part of decoded data such that pieces of pixel data about all components of the same pixel are stored in the second storage unit 103. The process controller 104 further makes the sorting circuit 105 output pixel data such that pieces of pixel data about a plurality of components are arranged in a line in a unit of a pixel.

The image processing device 1 uses part of the structure responsible for the sorting process for the decoded data conversion process. Sharing the structure between different image processes allows reduction of the circuit size of the image processing device 1, compared to the case where different structures are prepared for corresponding image processes.

2. Modifications

The present invention is not intended to be limited to the preferred embodiment described above.

Figure 14:
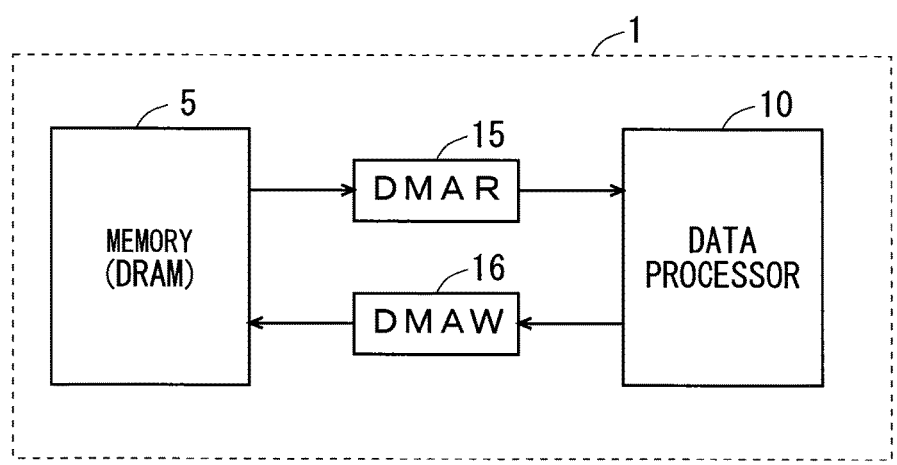
FIG. 14 is a schematic view of the structure of an image processing device of a modification.

As an example, in the preferred embodiment described above, the memory 5 is provided outside the image processing device 1. This is not the only form of the present invention. FIG. 14 shows the structure of the image processing device 1 of a modification.

More specifically, the memory 5 may be provided inside the image processing device 1 as shown in FIG. 14.

While the invention has been shown and described in detail, the foregoing description is in all aspects illustrative and not restrictive. It is therefore understood that numerous modifications and variations can be devised without departing from the scope of the invention.

What is claimed is:

1. An image processing device comprising:
circuitry configured to:
store, in a first storage, image data containing pieces of pixel information about a plurality of components of each pixel, wherein the plurality of components includes a luminance type component and two color difference type components;
store, in a second storage having a plurality of storage areas, said image data read from said first storage for each of said pieces of pixel information;

control reading of said image data from said first storage to said second storage;

output a control signal containing information used to designate four specific storage areas of said second storage;

output pixel information by selecting, based on said control signal, using four multiplexers a piece of pixel information stored in said second storage out of pieces of pixel information stored in said storage areas, wherein each of said plurality of storage areas is given one unique address such that a plurality of addresses, which differ from each other, is given to said plurality of storage areas storing said piece of pixel information about each of said luminance type component and said two color difference type components, each of said plurality of storage areas storing said piece of pixel information about each of said luminance type component and said two color difference type components stores only said piece of pixel information about one component of said plurality of components of one pixel such that said luminance type component and said two color difference type components each have corresponding unique addresses, and said control signal includes an address given to said four specific storage areas out of said plurality of addresses;

output, from said first storage, part of said image data such that pieces of pixel information about the same type of component of two or more successive pixels are stored in said second storage;

output, from said second storage, said pieces of pixel information about the same type of component of said two or more successive pixels;

calculate interpolated pixel information about an interpolated pixel by performing an interpolation calculation using the outputted pixel information and an interpolation coefficient; and output the calculated interpolated pixel information about said interpolated pixel.

2. The image processing device according to claim 1, wherein the circuitry is further configured to:

output, from said first storage, part of said image data such that pieces of pixel information about the same type of component of successive pixels are stored in said second storage;

output, from said second storage, pieces of pixel information about the same type of component of two successive pixels; and output the average of said pieces of pixel information about the same type of component of said two successive pixels as pixel information about said same type of component common to said two successive pixels.

3. The image processing device according to claim 1, wherein said image data stored in said first storage is plane-sequential image data in which pieces of pixel information about each of a plurality of components are arranged on a field basis or a frame basis, and wherein the circuitry is further configured to:

output, from the first storage, part of said plane-sequential image data such that pieces of pixel information about all components of the same pixel are stored in said second storage, and when outputting the pixel information by selecting the piece of pixel information stored in said four specific storage areas, output the pixel information such that pieces of pixel information about a plurality of components are output together in units of pixels.

4. The image processing device according to claim 1, wherein said image data stored in said first storage is dot-sequential image data in which pieces of pixel information about a plurality of components are arranged in units of pixels, and wherein the circuitry is further configured to:

output, from the first storage, part of said dot-sequential image data such that pieces of pixel information about all components of two or more successive pixels are stored in said second storage, and when outputting the pixel information by selecting the piece of pixel information stored in said four specific storage areas, output pixel information such that pieces of pixel information about the same type of component are output together.

5. The image processing device according to claim 1, wherein the circuitry is further configured to:

output, from the first storage, part of said image data such that pieces of pixel information about all components of the same pixel are stored in said second storage, output the same control signal several times according to a magnification factor, and when outputting the pixel information by selecting the piece of pixel information stored in said four specific storage areas, output pixel information about each component of the same pixel several times based on the same control that is output several times.

6. The image processing device according to claim 1, wherein said image data stored in said first storage is decoded data in units of blocks after being subjected to a video compression process, wherein the circuitry is further configured to:

output, from the first storage, part of said decoded data such that pieces of pixel information about all components of the same pixel are stored in said second storage, and when outputting the pixel information by selecting the piece of pixel information stored in said four specific storage areas, output pixel information such that pieces of pixel information about a plurality of components are output together in units of pixels.

7. An image processing device comprising:

circuitry configured to:

store, in a first storage, image data containing pieces of pixel information about a plurality of components of each pixel, wherein the plurality of components includes a luminance type component and two color difference type components;

store, in a second storage having a plurality of storage areas, said image data read from said first storage for each of said pieces of pixel information;

control reading of said image data from said first storage to said second storage;

output a control signal containing information used to designate four specific storage areas of said second storage; and output pixel information by selecting, based on said control signal, using four multiplexers a piece of pixel information stored in said second storage area out of said pieces of pixel information stored in said storage areas, wherein each of said plurality of storage areas is given one unique address such that a plurality of addresses, which differ from each other, is given to said plurality of storage areas storing said piece of pixel information about each of said luminance type component and said two color difference type components, each of said plurality of storage areas storing said piece of pixel information about each of said luminance type component and said two color difference type components stores only said piece of pixel information about one component of said plurality of components of one pixel such that said luminance type component and said two color difference type components each have corresponding unique addresses, and said control signal includes an address given to said four specific storage areas out of said plurality of addresses.

8. The image processing device according to claim 1, wherein the selected piece of pixel information includes luminance data or color data.

9. The image processing device according to claim 1, wherein the control signal includes an output selection coefficient used to designate the four specific storage areas.

10. The image processing device according to claim 1, wherein:
- each of the pieces of pixel information about one component of the plurality of components of one pixel is converted to a 16 bit format, and
- each of said plurality of storage areas includes a capacity to accommodate the 16 bit format of said piece of pixel information.

11. The image processing device according to claim 7, wherein:
- each of the pieces of pixel information about one component of the plurality of components of one pixel is converted to a 16 bit format, and
- each of said plurality of storage areas includes a capacity to accommodate the 16 bit format of said piece of pixel information.

12. The image processing device according to claim 1, wherein:
- a bit number of each capacity of said plurality of storage areas is the same as a bit number of said pixel information.

13. The image processing device according to claim 7, wherein:
- a bit number of each capacity of said plurality of storage areas is the same as a bit number of said pixel information.

* * * * *